United States Patent Office 3,220,932
Patented Nov. 30, 1965

3,220,932
RECOVERY OF ACROLEIN FROM PROPIONALDE-
HYDE BY EXTRACTIVE DISTILLATION
John W. Crandall, Malden, W. Va., assignor to Union
Carbide Corporation, a corporation of New York
No Drawing. Filed Mar. 10, 1964, Ser. No. 350,659
23 Claims. (Cl. 202—39.5)

This application is a continuation-in-part of my application Serial No. 120,205, filed June 28, 1961, and now forfeited.

This invention relates to a novel process for the production of acrolein having a high degree of purity from a mixture of acrolein and propionaldehyde. In another aspect, the present invention relates to a novel process for the production of acrolein having a high degree of purity from a mixture of acrolein, propionaldehyde and water.

The separation of acrolein from propionaldehyde or from propionaldehyde and water has been a problem to which the art has devoted considerable amount of attention. Acrolein is a well known and valuable compound which has found widespread commercial applications. The main commercial route for the production of acrolein has been through hydrocarbon oxidation wherein a hydrocarbon such as propane is oxidized to yield a wide variety of products, including acrolein.

The difficulties surrounding the separation of acrolein of a high degree of purity from admixture with propionaldehyde have been due to the closeness of their boiling points and relative volatilities. Consequently, separation by conventional distillation is rather impractical, if not impossible. The term "relative volatility" is well known in the art of distillation and is indicative of the relative ease of separation of one component from another component by distillation. The higher the relative volatility, the easier the separation. A relative volatility of one, for example, implies that there can be no separation by distillation. In case of a mixture of acrolein and propionaldehyde the art has shown that the relative volatility of acrolein to propionaldehyde is approximately 0.89. This, together with the closeness of their boiling point, indicate that distillation is an impractical method of separation of these two components unless, of course, the relative volatility of acrolein to propionaldehyde could be markedly increased. On the other hand, in order to obtain acrolein having a high degree of purity, it is necessary to remove water which is inherently formed in the oxidation process. The difficulties surrounding the removal of water from acrolein are due to the fact that water and acrolein from a homogeneous azeotrope containing 2.6 per cent by weight of water at atmospheric pressure.

The method most commonly employed in the prior art processes for the production of high purity acrolein has been extractive distillation, using such extractants as water and furfural. United States Patents 2,476,391, 2,514,966, 2,514,967 and 2,574,935 represent the approaches used by the prior art in attempting to solve the problem of producing high purity acrolein. However, the prior art processes suffer from one or more inherent limitations and disadvantages. Thus, aside from obtaining low productivity and rather low purity acrolein, they are expensive to install, maintain and operate.

It has now been discovered that the disadvantages of the prior art methods can be obviated by operating in accordance with the novel process of this invention. It is accordingly possible to produce high purity acrolein from a mixture of acrolein and propionaldehyde or a mixture of acrolein, propionaldehyde and water.

According to this invention, high purity acrolein is obtained when a mixture of acrolein and propionaldehyde or acrolein, propionaldehyde and water is contacted with an extractant, to be hereinafter defined, which extractant is also capable of reacting with the propionaldehyde. Since the separation of acrolein is effected by the simultaneous reaction of the extractant with propionaldehyde and the extraction of propionaldehyde with the extractant, these extractants will hereinafter be referred to as reactive-extractants and the novel process is said to employ selective reaction and extractive distillation. The use of the present extractants increases the relative volatility of acrolein to propionaldehyde to about as high as 3 to 7, depending upon the operating conditions, thus facilitating the removal of high purity acrolein from the mixture.

The novel process is carried out by introducing the reactive-extractant into a conventional distillation zone while a mixture of acrolein and propionaldehyde or acrolein, propionaldehyde and water is being distilled. The technique of introducing an extractant in a distillation column is not novel and is, in fact, a known practice in the art. The crux of the instant invention resides in the utilization of the present reactive-extractants since they not only serve as extractive agents, but they also react with propionaldehyde.

The compounds which are suitable as reactive-extractants in the process of this invention are the diols which contain from 2 to about 20 carbon atoms, preferably 2 to about 12 carbon atoms and most preferably from 2 to 8 carbon atoms. Exemplary diols are: ethylene glycol; 1,2-propylene glycol, 1,3-propylene glycol; 1,2-butylene glycol, 2,3-butylene glycol, 1,3-butylene glycol; 1,2-dihydroxypentane, 2,3-dihydroxypentane, 1,3-dihydroxypentane, 2,4-dihydroxypentane, 1,2-dihydroxy-3-methylpentane; 1,3-dihydroxy-3-ethylhexane; 2,4-dihydroxy-5-ethylheptane; 1,2-dihydroxy-4-methyl-6-butyldecane; 1,2-dihydroxyeicosane, 2,3-dihydroxyeicosane, 5,6-dihydroxy-eicosane, 5,6-dihydroxyeicosane; etc. Other diols include 1,2-cyclopentanediol, 1,2 - dihydroxy-4-octylcyclopentane, 1,2-dihydroxy-3-methyl-4-butylcyclopentane, 1,2 - hexanediol, 1,2-dihydroxy-4-ethyl-5-propylcyclohexane, etc.

Other reactive-extractants suitable for the present invention include the triols such as, for example, glycerol, 1,2,6-trihydroxyhexane, etc.

Still other suitable reactive-extractants are those monohydric primary aliphatic alcohols having 1 to about 20 carbon atoms; monohydric secondary aliphatic alcohols containing 3 to about 20 carbon atoms and alicyclic alcohols containing 5 or 6 carbon atoms in the ring, and a total of about 20 carbon atoms. Exemplary alcohols of these types are methanol, ethanol, 1-propanol, 2-propanol, 1-butanol, 2-butanol, primary pentanol, secondary pentanol, hexanols, heptanols, octanols, cyclopentanol, cyclohexanols, etc.

Still other suitable reactive-extracts which can be employed in the process of this invention are oxyalkylene glycol monoethers which can be represented by the general formula

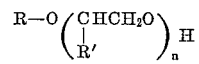

wherein R is an alkyl group having 1 to 12 carbon atoms, aryl group containing 6 to 10 carbon atoms, alkaryl group, aralkyl group or cycloalkyl group containing 5 to 12 carbon atoms, R' is hydrogen or methyl and $n$ is an integer whose value is from 1 to 5, preferably from 1 to 3. Examples of such compounds include monomethyl ether of ethylene glycol, monopropyl ether of ethylene glycol, monobutyl ether of ethylene glycol, mono(2-ethylhexyl)-ether of ethylene glycol, monomethyl ether of diethylene glycol, monopropyl ether of diethylene glycol, monobutyl ether of diethylene glycol, mono(2-ethylhexyl)ether of diethylene glycol, monomethyl ether of tripropylene glycol, monopropyl ether of tripropylene glycol, monobutyl ether of tripropylene glycol, mono(2-ethylhexyl)ether of tripropylene glycol, etc.; monophenyl ether of ethylene glycol, mono(α-naphthyl)ether of ethylene glycol, monoxylyl ether of ethylene glycol; monophenyl ether of diethylene glycol, mono(α-naphthyl)ether of diethylene glycol, monoxylyl ether of diethylene glycol, etc.; monocyclopentyl ether of ethylene glycol, monocyclohexyl ether of ethylene glycol, mono(2,4-diethylcyclohexyl)-ether of ethylene glycol, monocyclopentyl ether of diethylene glycol, monocyclohexyl ether of diethylene glycol, etc.

As previously indicated, the reactive-extractants which are employed in the present invention are capable of reacting with propionaldehyde to form reaction products which are readily separable from acrolein by distillation. While not wishing to be bound by any particular theory of operation, it appears that ethylene glycol, for example, selectively reacts with propionaldehyde to produce 2-ethyl-1,3-dioxolane and 1,7-dihydroxy-4-ethyl-3,5-dioxaheptane (acetal).

The ratio of the reactive-extractant to feed which can be employed to effect the desired separation is not narrowly critical. It can be appreciated, however that this ratio may vary depending upon the particular reactive-extractant which is employed, the composition of the original feed mixture and the operating conditions. This ratio therefore may vary from about 2:1 to about 100:1 by volume depending upon the foregoing factors. Using ethylene glycol, for example, it is desirable to use ethylene glycol-to-feed ratios within the range of about 2:1 to 8:1 and preferably from about 2:1 to about 4:1 by volume.

The temperature at which the novel process is conducted is not narrowly critical but no advantages are realized by conducting the process at a kettle temperature higher than about 160° C. The lower limit on the kettle temperature range is obviously dependent upon the particular reactive-extractant which is employed, the ratio of the reactive-extractant to the feed and the composition of the feed. Thus, the minimum temperature is that which is equal to the boiling point of the kettle component having the lowest boiling point.

The process of this invention can be effected at subatmospheric, atmospheric or superatmospheric pressure. One particular advantage of the instant process is that it can be effected at substantially atmospheric pressure or slightly below. This feature is of particular commercial significance since it eliminates the necessity of employing expensive refrigeration equipment which must invariably be used when operating at pressures which are extremely low.

It is to be pointed out that, if it is desired to produce acrolein from a mixture consisting of acrolein and propionaldehyde it is not necessary to maintain any specific reflux-to-make ratio, whereas a reflux ratio of about 0.5:1 to about 3:1 by volume is desirable when separating acrolein from a mixture consisting of acrolein, propionaldehyde and water.

It has been further discovered that the addition of a small amount of acid to the reactive-extractant produces even better results than the use of the reactive-extractant alone. The use of acid catalyzes the reaction between propionaldehyde and the reactive-extractant so that the reaction products are more readily formed and separated. The acids which can be employed in the novel process of this invention include phosphoric acid, sulfuric acid, p-toluene sulfonic acid, formic acid, hydrochloric acid, etc.

The amount of acid is not narrowly critical and depends, obviously, upon the particular acid which is employed. In general, the concentration of the acid may vary between about 0.02 and about 4 percent by weight of the reactive-extractant which is employed. Although acid concentrations higher than about 4 percent can be employed, no particular advantage is realized from using such higher concentrations.

It is understood that many obvious modifications fall within the scope of the present invention. For instance, it may be desirable to react the reactive-extractant with the mixture of acrolein and propionaldehyde in a separate reaction zone and thereafter subject the resulting mixture to distillation to separate the acrolein. It is also possible to add part of the reactive-extractant to the feed to the distillation zone in order to increase the contact time of the reactive-extractant with the feed, thereby accelerating the formation of the reaction products in the distillation zone and improve their separation from acrolein.

The following examples serve to further illustrate the novel process of this invention.

Example 1

Feed containing 1 weight percent propionaldehyde (the remainder being essentially acrolein) was fed into a 60-tray Oldershaw still column at a point 10 trays above the kettle. Ethylene glycol containing 0.1 percent phosphoric acid was introduced 50 trays above the still kettle. The first 50 trays above the kettle were 50 mm. diameter Oldershaw trays with 2-inch tray spacing. The 10 trays above the solvent addition point were 28 mm. diameter Oldershaw trays with 1-inch spacing.

The column was operated at 560 mm. of mercury absolute pressure using a 3:1 reflux-to-make ratio and an ethylene glycol-to-feed ratio ranging from 5:1 to 6:1 by volume. Approximately 75 weight percent of the acrolein fed into the column was recovered overhead and contained from 0.04 to 0.06 weight percent propionaldehyde. The samples were analyzed by gas chromatography.

Example 2

Feed consisting primarily of acrolein and propionaldehyde and 6.3 weight percent water was fed into the column described in Example 1. The column was operated at 560 mm. of mercury absolute pressure using a 3:1 reflux-to-make ratio and an ethylene glycol-to-feed ratio of 7:1. In this case, the distillate contained 0.5 weight percent water.

Example 3

Feed containing 70 weight percent acrolein, 27 weight percent propionaldehyde, and 3 weight percent water was fed into a 30-tray still column at a point 5 trays above the still kettle. Ethylene glycol containing 3 weight percent phosphoric acid was introduced 25 trays above the still kettle. The distillation was conducted at atmospheric pressure using a solvent-to-feed ratio of 5:1 by volume. No material was refluxed down the column. The first 5 trays above the kettle were Oldershaw trays 28 mm. diameter and 2-inch tray spacing. The remainder of the column consisted of 25 Oldershaw trays 28 mm. diameter and with 1-inch tray spacing.

In this run, acrolein containing 2.8 weight percent propionaldehyde was removed overhead. Approximately 95 weight percent of the acrolein fed into the column was recovered in the overhead product, based on gas chromatogaphic analyses.

Examples 4–7

The following examples were conducted in a conventional distillation column employing a feed consisting of 71% acrolein, 26% propionaldehyde and 3% water. The results are shown in the following table:

TABLE I

| Ex. | Kettle Temp., ° C. | Ratios by Volume | | Phosphoric acid concentration, Wt. percent | Acrolein in Distillate, Wt. percent |
|---|---|---|---|---|---|
| | | Solvent/Feed | Distillate/Feed | | |
| 4 | 146 | 5.4 | 0.73 | 3 | 94.4 |
| 5 | 145 | 5.4 | 0.72 | 4 | 94.8 |
| 6 | 145 | 5.3 | 0.70 | 5 | 94.9 |
| 7 | 165 | 7.8 | 0.63 | 5 | 94.8 |

From the above examples it can be seen that no advantage is gained in heating at temperatures higher than about 160° C. or in using more than 4% acid.

Examples 8–16

The following is a summary of the results obtained when using sulfuric acid and a feed of acrolein 71.5% by weight; propionaldehyde 25.5% by weight and water 3.0% by weight.

TABLE II

| Example | Temp., ° C., Kettle | Solvent/feed | Distillate/feed | Reflux | Sulfuric Acid, percent [a] | Acrolein in Distillate, Wt. percent [b] |
|---|---|---|---|---|---|---|
| 8 | 144 | 2.1 | 0.69 | 1.5 | 0.2 | 98.8 |
| 9 | 135 | 3.2 | 0.64 | 1.5 | 0.2 | 98.8 |
| 10 | 126 | 2.4 | 0.56 | 2.0 | 0.2 | 96.6 |
| 11 | 134 | 2.4 | 0.71 | 2.0 | 0.1 | 98.6 |
| 12 | 135 | 3.0 | 0.66 | 2.0 | 0.02 | 98.0 |
| 13 | 130 | 3.56 | 0.61 | 1.5 | 0.04 | 98.7 |
| 14 | 142 | 4.4 | 0.62 | 1.5 | 0.04 | 99.5 |
| 15 [c] | 148 | [e] 4.4 | 0.41 | 1.5 | 0.04 | 99.8 |
| 16 [d] | 132 | [f] 3.0 | 0.63 | 1.0 | 0.045 | 99.5 |

[a] Percent by weight in ethylene glycol.
[b] Based on ratio of acrolein to propionaldehyde by gas chromatographic analysis.
[c] For this run the feed was premixed with acidified ethylene glycol prior to being introduced to the column.
[d] For this run the feed and acidified glycol were fed continuosuly to a surge tank to provide 45 minutes reaction time prior to being introduced to the column.

[e] Solvent/feed is based on $\dfrac{\text{glycol fed in column}}{\text{glycol+feed mixture}}$

[f] Solvent/feed is based on $\dfrac{\text{glycol mixed+glycol fed}}{\text{feed}}$

Example 17

This example illustrates the use of propanol as reactive-extractant.

Feed containing 70.5 weight percent propionaldehyde, 25.0 weight percent acrolein, the remainder being water, acetaldehyde, acetone, etc., was fed into a 50-tray Oldershaw still column at a point 15 trays above the still kettle. Propanol containing 0.2 weight percent sulfuric acid was fed to the column at a point 35-trays above the still kettle. The trays were all 28 mm. diameter Oldershaw trays with 1-inch tray spacing.

The column was operated at atmospheric pressure and a kettle temperature of 88.5° C. The reflux-to-make ratio and the propanol-to-feed ratio were 3:1 and 2.15:1 by volume respectively. Approximately 86.3 percent by weight of acrolein fed to the column was recovered as distillate and contained 2.0 weight percent propionaldehyde and 3.1 weight percent water.

Example 18

This example illustrates the use of 2,3-butylene glycol as the reactive-extractant.

Feed containing 70 weight percent acrolein and 25 weight percent propionaldehyde was premixed for approximately 30 minutes with 2,3-butylene glycol containing 0.3 volume percent sulfuric acid, in a volume ratio of 2.6:1 acidified glycol to feed. The mixture was fed to a 50-tray Oldershaw still kettle at a point 15 trays above the kettle. The trays were 28 mm. diameter Oldershaw trays with 1-inch spacing Four additional volumes of the acidified 2,3-butylene glycol were fed to the column at a point 35 trays above the kettle.

The column was operated at atmospheric pressure, a kettle temperature of 119° C. and a reflux-to-make ratio of 3.5:1. Approximately 84 weight percent of the acrolein fed to the column was recovered as distillate and contained 1.9 weight percent propionaldehyde.

Example 19

This example illustrates the use of 1,2-butylene glycol as the reactive-extractant.

In this example an Oldershaw still column was used which was packed above the kettle with protruded packing to a height equivalent to approximately 5 theoretical plates. Otherwise the column contained 30 trays, 28 mm. in diameter and spaced 1-inch apart.

Feed containing 70 weight percent acrolein and 25 weight percent propionaldehyde was premixed for approximately one hour with 1,2-butylene glycol containing 0.2 volume percent sulfuric acid, in a volume ratio of 1.1:1 glycol to feed. The mixture was fed to the column above the packing section and one additional volume of the acidified 1,2-butylene glycol was introduced into the column at a point above the 20th tray.

The column was operated at atmospheric pressure, a kettle temperature of 125° C. and a reflux-to-make ratio of 2:1. Approximately 91 weight percent of the acrolein feed was recovered as distillate which contained 0.4 weight percent propionaldehyde and 94.2 weight percent acrolein.

Example 20

This example illustrates the use of methyl Cellosolve as the reactive-extractant.

Feed containing 75 weight percent acrolein and 25 weight percent propionaldehyde was premixed with Cellosolve in 1:1 volume ratio. The Cellosolve contained 0.04 weight percent sulfuric acid. The mixture was fed to a 65-tray Oldershaw still column at a point 25 trays above the kettle. The trays were 28 mm. diameter Oldershaw trays with 1-inch spacing. Additional acidified Cellosolve was added to the column at a point 45 trays above the kettle. Thus the ratio of Cellosolve to feed in the column was 5.8:1.

The column was operated at atmospheric pressure, a kettle temperature of 118° C. and a reflux-to-make ratio of 2.0:1. The distillate which was recovered consisted of 99.1 and 0.9 weight percents acrolein and propionaldehyde respectively as analyzed by gas chromatography.

Example 21

This example illustrates the use of butyl carbitol as the reactive-extractant. The column employed in this example was the same as that used in Example 20.

Feed containing 75 weight percent propionaldehyde and 25 weight percent acrolein was premixed with 2 volumes of butyl carbitol containing 0.04 weight percent sulfuric acid. Additional acidified butyl carbitol was added to the column so that the ratio of carbitol to the feed in the column was 7.5:1. The points of introduction of the premixed feed and the additional carbitol were the same as in Example 20.

The column was operated at atmospheric pressure, a kettle temperature of 173° C. and a reflux-to-make ratio of 2.0:1. The distillate which was recovered consisted of 98.3 and 1.7 weight percents acrolein and propionaldehyde respectively as analyzed by gas chromatography.

Example 22

This example illustrates the production of acrolein essentially free of propionaldehyde and containing minimal amount of water.

Feed consisting of 24 weight percent propionaldehyde, 69 weight percent acrolein, 2.5 weight percent water and 4.5 weight percent of acetaldehyde, propylene oxide, acetone, 1,2-butylene oxide and methanol was premixed with 2 volumes of ethylene glycol containing 1 weight percent phosphoric acid and allowed to stand for 1 hour. The feed was introduced into a 65-tray Oldershaw column at a point 25 trays above the kettle. The trays were each 50 mm. in diameter and spaced at 2 inch intervals. Ethylene glycol containing 2 weight percent phosphoric acid was introduced at a point 50 trays above the kettle at a ratio 0.66 volume of acidified ethylene glycol to one volume of feed. Acid-free ethylene glycol was also introduced into the column at a point 55 trays above the kettle in the ratio of 0.63:1 ethylene glycol-to-feed.

The column was operated at atmospheric pressure and a reflux ratio of 1.5. The kettle temperature and the column head temperature were 156° C. and 51° C. respectively. Approximately 89 weight percent of the acrolein fed to the column was recovered as overhead distillate which contained 96.7 percent acrolein, 0.1 percent water, 3.4 percent impurities and no detectable quantity of propionaldehyde, all percents being by weight.

Other reactive extractants can be employed to remove both propionaldehyde and water from a feed mixture containing acrolein, propionaldehyde and water by the procedure described in Example 22. These reactive-extractants, which must be essentially anhydrous, include glycerol, ethylene glycol, propylene glycol, alkyl monoethers of ethylene glycol and alkyl monoethers of diethylene glycol wherein the alkyl group contains 1 to 6 carbon atoms, the monohydric primary aliphatic alcohols containing 1 to 4 carbon atoms and the monohydric secondary aliphatic alcohols containing 1 to 4 carbon atoms.

What is claimed is:

1. In the process for the production of acrolein from a feed mixture consisting essentially of acrolein and propionaldehyde wherein said mixture is fed into a distillation zone, the improvement which comprises contacting said mixture in said distillation zone with a reactive-extractant selected from the group consisting of diols having 2 to about 20 carbon atoms, triols selected from the group consisting of glycerol and 1,2,6-trihydroxyhexane, monohydric primary aliphatic alcohols containing 1 to 20 carbon atoms, monohydric secondary aliphatic alcohols having 3 to 20 carbon atoms and oxyalkylene glycol monoethers of the general formula

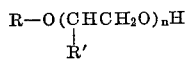

wherein R is selected from the group consisting of alkyl, aryl, alkaryl, aralkyl and cycloalkyl and R' is selected from the group consisting of hydrogen and methyl and $n$ is an integer whose value varies from 1 to 5, subjecting the resulting mixture to extractive distillation in said distillation zone, and recovering substantially pure acrolein as distillate from said distillation zone.

2. The process of claim 1 wherein said feed mixture consists essentially of acrolein, propionaldehyde and water.

3. The process of claim 1 wherein said reactive-extractant is introduced into said distillation zone within the range of about 2:1 to about 100:1 by volume of said feed.

4. The process of claim 2 wherein said reactive-extractant is introduced into said distillation zone within the range of from about 2:1 to about 100:1 by volume of said feed.

5. The process of claim 4 wherein the reflux-to-make ratio of about 0.5:1 to about 3:1 is maintained in said distillation zone.

6. The process of claim 1 wherein said reactive-extractant contains from about 0.02 to about 4 weight percent of an acid.

7. The process of claim 2 wherein said reactive-extractant contains from about 0.02 to about 4 weight percent of an acid.

8. In the process of claim 1 wherein said reactive-extractant is ethylene glycol.

9. In the process of claim 2 wherein said reactive-extractant is ethylene glycol.

10. In the process of claim 1 wherein said reactive-extractant is propylene glycol.

11. In the process of claim 2 wherein said reactive-extractant is propylene glycol.

12. In the process of claim 1 wherein said reactive-extractant is butylene glycol.

13. In the process of claim 2 wherein said reactive-extractant is butylene glycol.

14. In the process of claim 1 wherein said reactive-extractant is propanol.

15. In the process of claim 1 wherein said reactive-extractant is methyl cellosolve.

16. In the process of claim 2 wherein said reactive-extractant is methyl cellosolve.

17. In the process of claim 1 wherein said reactive-extractant is butyl carbitol.

18. In the process of claim 2 wherein said reactive-extractant is butyl carbitol.

19. In the process of claim 6 wherein said acid is sulfuric acid.

20. In the process of claim 7 wherein said acid is sulfuric acid.

21. In the process of claim 6 wherein said acid is phosphoric acid.

22. In the process of claim 7 wherein said acid is phosphoric acid.

23. In the process for the separation of acrolein from a mixture comprising essentially of acrolein, propionaldehyde and water to produce acrolein essentially free from propionaldehyde and water wherein said mixture is fed, together with acidified reactive-extractant, to a distillation zone, said reactive extractant being selected from the group consisting of diols having 2 to about 20 carbon atoms, triols selected from the group consisting of glycerol and 1,2,6-trihydroxyhexane, alkyl monoethers of ethylene glycol, alkyl monoethers of diethylene glycol, said alkyl groups containing from 1 to 6 carbon atoms, monohydric primary aliphatic alcohols of 1 to 4 carbon atoms and monohydric secondary aliphatic alcohols having 1 to 4 carbon atoms, introducing additional quantity of reactive-extractant into said distillation zone at a point above the point of entry of said feed mixture with the reactive-extractant, subjecting the resulting mixture to extractive distillation in said distillation zone and recovering acrolein essentially free from water and propionaldehyde as distillate from said distillation zone.

References Cited by the Examiner

UNITED STATES PATENTS 2,476,391   7/1949   Stautzenberger ____ 202—39.5 X
2,767,216  10/1956   Evans _____ 260—601

FOREIGN PATENTS 520,089   12/1955   Canada.

NORMAN YUDKOFF, *Primary Examiner.*